Patented Mar. 14, 1939

2,150,555

UNITED STATES PATENT OFFICE 2,150,555

TREATMENT OF MATERIALS CONTAINING TANTALUM AND/OR NIOBIUM

Joseph Pierre Leemans, Hoboken-lez-Anvers, Belgium, assignor to Société Générale Metallurgique de Hoboken, Hoboken-lez-Anvers, Belgium No Drawing. Application January 27, 1938, Serial No. 187,246. In Great Britain March 19, 1937

1 Claim. (Cl. 75—135)

This invention relates to the treatment of primary materials, such as ores or metallurgical by-products, containing tantalum and/or niobium.

One object of the invention is to extract the tantalum and/or niobium in a comparatively simple and economical way.

Another object of the invention is to obtain the tantalum and/or niobium in the form of a ferro-alloy in a simple and economical way.

According to the invention, the primary material is subjected to a reducing operation in the presence of carbide of calcium.

The said reducing operation may be carried out in the presence of iron so as to obtain a ferro-alloy. The latter ferro-alloy may be refined with oxides or oxide compounds of Ta and/or Nb.

The reducing operation may be carried out in any suitable metallurgical furnace. For instance, it may be carried out in an electric furnace in the presence of calcium carbide and of the usual fluxes which are considered necessary for obtaining a fluid slag.

Iron may be added either in metal form, or in oxide form, and the amount added is that required for obtaining a ferro-alloy of the desired composition. The addition of iron may be effected either before, or during or after the reducing process.

A ferro-tantalum and/or niobium alloy is obtained which contains carbon. This alloy may be refined in an electric furnace in the presence of oxides of Ta and/or Nb. The slag may also be treated separately for the recovery of various elements.

According to another feature of the present invention the primary material is subjected to a reducing operation by means of an amount of calcium carbide insufficient for completely reducing the two elements niobium and tantalum, whereby an alloy is obtained in which the ratio Nb-Ta is higher than that of the primary material.

Iron may be added before, during or after the reducing operation, in metal or oxide form as required, so as to obtain a ferro-alloy of the required composition.

For instance, the primary material containing the tantalum and niobium and iron may be treated inside an electric furnace in the presence of such an amount of calcium carbide as to reduce the major part of the niobium and to obtain a ferro-niobium alloy containing also some tantalum, but in which the ratio Nb-Ta is higher than that of the primary material. By the same operation a slag rich in tantalum is obtained, containing also some niobium and in which the ratio Ta-Nb is higher than that of the primary material.

The slag thus obtained rich in tantalum, may be subjected to any known suitable treatment for the recovery of niobium and tantalum, whilst the ferro-alloy obtained by the first said reducing operation may be refined in any suitable metallurgical apparatus e. g. in an electric furnace by oxides of niobium or even by oxides of niobium and tantalum, the former one being reduced prior to the latter.

This refining operation will give a ferro-niobium containing some tantalum in which the ratio Nb-Ta will be higher than the same in the primary material and a slag containing some tantalum and niobium to be treated by any known means in order to recover those elements, as is the case with the slag obtained by the original reducing operation.

I claim:

A process for the treatment of primary materials containing tantalum and niobium, in which the primary material is subjected to a selective reducing operation by means of an amount of calcium carbide which is insufficient completely to reduce the two elements tantalum and niobium, thus obtaining an alloy in which the ratio niobium/tantalum is higher than that in the primary material, whilst avoiding an excess of carbon.

JOSEPH PIERRE LEEMANS.